US012798196B2

(12) United States Patent
Taya et al.

(10) Patent No.: US 12,798,196 B2
(45) Date of Patent: Nov. 17, 2026

(54) MOLDED BODY, JOINING METHOD, AND METHOD FOR PRODUCING MOLDED BODY

(71) Applicant: LINTEC CORPORATION, Tokyo (JP)

(72) Inventors: Naoki Taya, Tokyo (JP); Yuki Kawaharada, Tokyo (JP)

(73) Assignee: LINTEC Corporation, Tokyo (JP)

( * ) Notice: Subject to any disclaimer, the term of this patent is extended or adjusted under 35 U.S.C. 154(b) by 934 days.

(21) Appl. No.: 18/023,979

(22) PCT Filed: Aug. 24, 2021

(86) PCT No.: PCT/JP2021/031050
§ 371 (c)(1),
(2) Date: Feb. 28, 2023

(87) PCT Pub. No.: WO2022/045156
PCT Pub. Date: Mar. 3, 2022

(65) Prior Publication Data

US 2023/0321921 A1 Oct. 12, 2023

(30) Foreign Application Priority Data

Aug. 31, 2020 (JP) ................................. 2020-146091

(51) Int. Cl.
*B29C 65/04* (2006.01)
*B29C 65/48* (2006.01)
*B29K 101/12* (2006.01)

(52) U.S. Cl.
CPC .......... *B29C 65/04* (2013.01); *B29K 2101/12* (2013.01); *B29K 2995/0005* (2013.01)

(58) Field of Classification Search
CPC . B29C 65/04; B29C 65/1425; B29C 65/1483; B29C 65/4815; B29C 65/4875; B29C 65/5057; B29C 66/112; B29C 66/1122; B29C 66/114; B29C 66/1142; B29C 66/41; B29C 66/43; B29C 66/522; B29C 66/526; B29C 66/532; B29C 66/71; B29C 66/712; B29C 66/721; B29C 66/7212; B29C 66/727; B29C 66/7332; B29C 66/7392; B29C 66/73921; B29C 66/74; B29C 66/742; B29C 66/7461; B29C 66/7465; B29K 2009/06; B29K 2023/06;
(Continued)

(56) References Cited

FOREIGN PATENT DOCUMENTS

EP 4129657 A1 2/2023
JP S62-108035 A 5/1987
(Continued)

OTHER PUBLICATIONS

Translation of JP2009066924A, "Composite Material and Its Manufacturing Method", Apr. 2, 2009, by WIPO (Year: 2009).*
(Continued)

*Primary Examiner* — Quang T Van
(74) *Attorney, Agent, or Firm* — Rimon P.C.

(57) ABSTRACT

A molded body includes: a first portion including a first material that contains a first thermoplastic resin and a dielectric filler that generates heat upon application of a high-frequency electric field; and a second portion including a second material different from the first material of the first portion.

13 Claims, 4 Drawing Sheets

(58) Field of Classification Search
CPC ............ B29K 2023/12; B29K 2023/16; B29K 2025/06; B29K 2033/12; B29K 2055/02; B29K 2059/00; B29K 2067/00; B29K 2067/003; B29K 2067/006; B29K 2069/00; B29K 2075/00; B29K 2077/00; B29K 2083/00; B29K 2101/12; B29K 2277/10; B29K 2307/04; B29K 2309/08; B29K 2995/0005
USPC ........ 219/765, 764, 766, 769, 770, 773, 774
See application file for complete search history.

(56) References Cited

FOREIGN PATENT DOCUMENTS

| | | | | |
|---|---|---|---|---|
| JP | H07-139681 | A | | 5/1995 |
| JP | H07-171896 | A | | 7/1995 |
| JP | H09-70867 | A | | 3/1997 |
| JP | 2000-233450 | A | | 8/2000 |
| JP | 2003342478 | A | * | 12/2003 |
| JP | 2009-066924 | A | | 4/2009 |
| JP | 2020-070366 | A | | 5/2020 |
| WO | 92/09842 | A1 | | 6/1992 |
| WO | 2018/079354 | A1 | | 5/2018 |

OTHER PUBLICATIONS

Translation of JP2020070366A, "High-Frequency Dielectric Heating Adhesive sheet, Method of Joining Pipe and Pipeline Connection Body", May 7, 2020, by WIPO. (Year: 2020).*
International Search Report issued in corresponding International Patent Application No. PCT/JP2021/031050, dated Nov. 2, 2021, with English translation.
English translation of the International Preliminary Report on Patentability issued in corresponding International Patent Application No. PCT/JP2021/031050, dated Feb. 28, 2023.
Extended European Search Report dated Jul. 30, 2024, for corresponding European patent application No. 21861580.5, 11 pages.

* cited by examiner

MOLDED BODY, JOINING METHOD, AND METHOD FOR PRODUCING MOLDED BODY

CROSS REFERENCE TO RELATED APPLICATIONS

This patent application is the U.S. National Phase under 35 U.S.C. § 371 of International Application No. PCT/JP2021/031050, filed on Aug. 24, 2021, which claims the benefit of Japanese Patent Application No. 2020-146091, dated Aug. 31, 2020, the entire contents of each are hereby incorporated by reference in their entirety.

TECHNICAL FIELD

The present invention relates to a molded body, a bonding method, and a method of producing the molded body.

BACKGROUND ART

As a method of bonding adherends having difficulty in bonding, there has been recently proposed, for instance, a method including performing a dielectric heating treatment, an induction heating treatment, a supersonic welding treatment, a laser welding treatment, or the like with an adhesive agent interposed between the adherends, the adhesive agent being made by mixing a heat-generating material into a predetermined resin.

For instance, Patent Literature 1 describes a technology for fusing a body of an electro fusion joint and a member to bond by electromagnetic induction. Patent Literature 1 also describes that a magnetic alloy body is embedded near a bonding surface of the body of the electro fusion joint, and the magnetic alloy body generates heat when a high frequency current is applied to the magnetic alloy body by electromagnetic induction.

CITATION LIST

Patent Literature(s)

Patent Literature 1: WO 92/09842

SUMMARY OF THE INVENTION

Problem(s) to be Solved by the Invention

There is a demand for a molded body capable of being bonded to an adherend (another molded article) by any other method than an induction heating method as described in Patent Literature 1 as well as a bonding method therefor, the induction heating method requiring a magnetic alloy body to be embedded in a body in order to fuse the body to a member to bond.

Objects of the invention are to provide a molded body that is capable of being bonded to an adherend (another molded article) by high-frequency dielectric heating without using an adhesive agent and that is unlikely to be deformed during bonding, to provide a bonding method using the molded body, and to provide a method of producing the molded body.

Means for Solving the Problem(s)

According to an aspect of the invention, there is provided a molded body, including: a first portion including a first material that contains a first thermoplastic resin (A1) and a dielectric filler (B) that generates heat upon application of a high-frequency electric field; and a second portion including a second material different from the first material of the first portion.

In the molded body according to the aspect of the invention, a volume content ratio of the dielectric filler (B) of the first portion is preferably in a range from 5 vol % to 50 vol %.

In the molded body according to the aspect of the invention, the molded body is preferably not a sheet.

In the molded body according to the aspect of the invention, a flow start temperature of the first portion is preferably in a range from 80 degrees C. to 300 degrees C.

In the molded body according to the aspect of the invention, a flow start temperature of the second portion is preferably 100 degrees C. or more or the second portion preferably has no flow start temperature.

In the molded body according to the aspect of the invention, a flow start temperature T1 of the first portion and a flow start temperature T2 of the second portion preferably satisfy a relationship of a numerical formula (Numerical Formula 2) below, $$T1 < T2. \qquad \text{(Numerical Formula 2)}$$

In the molded body according to the aspect of the invention, a dielectric property DP1 of the first portion and a dielectric property DP2 of the second portion preferably satisfy a relationship of a numerical formula (Numerical Formula 1) below, and the dielectric property DP1 is preferably a dielectric property value (tan δ/ε'r) of the first portion and the dielectric property DP2 is preferably a dielectric property value (tan δ/ε'r) of the second portion, $$DP1 > DP2 \qquad \text{(Numerical Formula 1)}$$

where tan δ is a dielectric dissipation factor at 23 degrees C. and a frequency of 40.68 MHz, and ε'r is a relative permittivity at 23 degrees C. and a frequency of 40.68 MHz.

In the molded body according to the aspect of the invention, the second material of the second portion preferably contains a second thermoplastic resin (A2).

In the molded body according to the aspect of the invention, a main composition of the first thermoplastic resin (A1) is preferably identical to a main composition of the second thermoplastic resin (A2).

In the molded body according to the aspect of the invention, a surface of the first portion is preferably bonded to an adherend in use.

In the molded body according to the aspect of the invention, a surface of a portion other than the first portion in the molded body is brought into contact with an electrode of a dielectric heating device in use.

According to another aspect of the invention, there is provided a bonding method of bonding any of the molded bodies according to the above aspect of the invention and an adherend different from the molded body, the method including: bringing the adherend into contact with a surface of the first portion; bringing an electrode of a dielectric heating device into contact with a surface of a portion other than the first portion; and applying a high-frequency electric field to the molded body using the dielectric heating device to bond the molded body and the adherend.

According to still another aspect of the invention, there is provided a molded body production method of producing any of the molded bodies according to the above aspect of the invention, the method including molding the molded body by a multicolor molding method using the first material and the second material.

According to a further aspect of the invention, there is provided a molded body production method of producing any of the molded bodies according to the above aspect of the invention, the method including producing the molded body by an insert molding method using a first molded body formed from one of the first material and the second material and using the other of the first material and the second material.

According to a still further aspect of the invention, there is provided a molded body production method of producing any of the molded bodies according to the above aspect of the invention, the method including: molding a first molded body by an injection molding method or a compaction molding method using one of the first material and the second material; and producing the molded body by an insert molding method using the other of the first material and the second material and the first molded body.

According to the aspect of the invention, it is possible to provide a molded body that is capable of being bonded to an adherend (another molded article) by high-frequency dielectric heating without using an adhesive agent and that is unlikely to be deformed during bonding. According to the aspect of the invention, it is possible to provide a bonding method using the molded body. According to the aspect of the invention, it is possible to provide a method of producing the molded body.

DESCRIPTION OF EMBODIMENT(S)

Figure 1A:
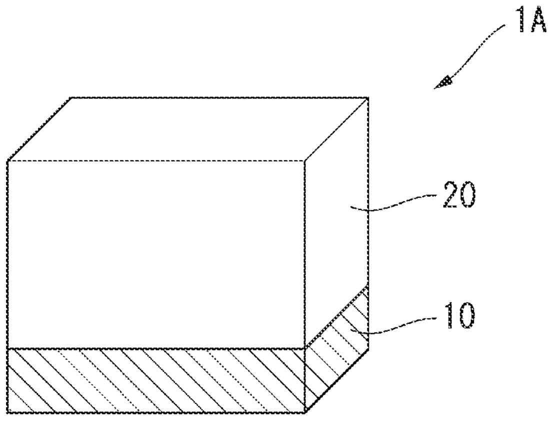
FIG. 1A is a schematic perspective view of an exemplary form of a molded body according to an exemplary embodiment.

A molded body according to an exemplary embodiment includes: a first portion including a first material that contains a first thermoplastic resin (A1) and a dielectric filler (B) that generates heat upon application of a high-frequency electric field; and a second portion including a second material different from the first material of the first portion. The high-frequency electric field is an electric field of which direction is reversed at high frequencies.

First Portion

The first portion includes the first material that contains the first thermoplastic resin (A1) and the dielectric filler (B) that generates heat upon application of a high-frequency electric field.

First Thermoplastic Resin (A1)

Thermoplastic Resin

The type of the first thermoplastic resin (A1) is not particularly limited.

In terms of, for instance, meltability and possession of a predetermined heat resistance, the first thermoplastic resin (A1) is preferably at least one selected from the group consisting of a polyolefin resin, a styrene resin, a polyacetal resin, a polycarbonate resin, a polyacrylic resin, a polyamide resin, a polyimide resin, a polyvinyl acetate resin, a phenoxy resin, and a polyester resin.

In the molded body according to the exemplary embodiment, the first thermoplastic resin (A1) is preferably a polyolefin resin. When the first thermoplastic resin (A1) is a polyolefin resin, the first portion is easy to melt during application of a high-frequency electric field, which makes it possible to easily bond the molded body according to the exemplary embodiment and an adherend together.

Herein, the polyolefin resin includes a polyolefin resin having a polar site and a polyolefin resin having no polar site. The wording of a polyolefin resin having a polar site or a polyolefin resin having no polar site is used in a case where the presence/absence of a polar site in the polyolefin resin is specified.

The first thermoplastic resin (A1) is also preferably a polyolefin resin having a polar site. The first thermoplastic resin (A1) may be a polyolefin resin having no polar site.

Polyolefin Resin

Examples of the polyolefin resin as the thermoplastic resin include a resin including a homopolymer such as polyethylene, polypropylene, polybutene, and polymethylpentene, and an α-olefin resin including a copolymer of a monomer selected from the group consisting of ethylene, propylene, butene, hexene, octene, and 4-methylpentene. The polyolefin resin as the thermoplastic resin may be a single type of resin or a combination of two or more types of resins.

Polyolefin Resin Having Polar Site

Regarding a polyolefin resin having a polar site, the polar site is not particularly limited as long as the site can polarize the polyolefin resin. The polyolefin resin having the polar site is preferable as exhibiting high adhesion force with respect to an adherend.

A polyolefin thermoplastic resin having a polar site may be a copolymer of an olefin monomer and a monomer having a polar site. Further, the polyolefin thermoplastic resin having the polar site may be a resin provided by introducing, through modification such as addition reaction, a polar site into an olefin polymer obtained by polymerizing olefin monomers.

The type of the olefin monomer constituting the polyolefin resin having the polar site is not particularly limited. Examples of the olefin monomer include ethylene, propylene, butene, hexene, octene, and 4-methyl-1-pentene. One of the above examples may be used alone or a combination of two or more thereof may be used as the olefin monomer.

Ethylene and propylene are preferably used as the olefin monomer in view of providing excellent mechanical strength and stable adhesive characteristics.

Preferably, a constituent unit derived from olefin in the polyolefin resin having the polar site is a constituent unit derived from ethylene or propylene.

Examples of the polar site include a hydroxyl group, a carboxy group, a vinyl acetate structure, and an acid anhydride structure. Further, the polar site is exemplified by an acid-modified structure that is to be introduced into a polyolefin resin by acid modification.

The acid-modified structure as the polar site is a site that is introduced by acid modification of a thermoplastic resin (e.g., a polyolefin resin). A compound used for acid modification of a thermoplastic resin (e.g., polyolefin resin) is exemplified by an unsaturated carboxylic acid derivative component derived from any one of an unsaturated carboxylic acid, an acid anhydride of an unsaturated carboxylic acid, and an ester of an unsaturated carboxylic acid. Herein, the polyolefin resin having the acid-modified structure is occasionally referred to as an acid-modified polyolefin resin.

Examples of the unsaturated carboxylic acid include an acrylic acid, a methacrylic acid, a maleic acid, a fumaric acid, an itaconic acid, and a citraconic acid.

Examples of the acid anhydride of the unsaturated carboxylic acid include maleic anhydride, itaconic anhydride, and citraconic anhydride.

Examples of the ester of the unsaturated carboxylic acid include methyl acrylate, ethyl acrylate, methyl methacrylate, ethyl methacrylate, butyl methacrylate, dimethyl maleate, monomethyl maleate, dimethyl fumarate, diethyl fumarate, dimethyl itaconate, diethyl itaconate, dimethyl citraconate, diethyl citraconate, and dimethyl tetrahydrophthalate anhydride.

When the thermoplastic resin as the first thermoplastic resin (A1) is a copolymer of an olefin monomer and a monomer having a polar site, the copolymer contains a constituent unit derived from the monomer having the polar site at a content of preferably 2 mass % or more, more preferably 4 mass % or more, still more preferably 5 mass % or more, and still further more preferably 6 mass % or more. Further, the copolymer contains a constituent unit derived from the monomer having the polar site at a content of preferably 30 mass % or less, more preferably 25 mass % or less, still more preferably 20 mass % or less, and still further more preferably 15 mass % or less.

The copolymer containing 2 mass % or more of a constituent unit derived from the monomer having the polar site improves the bonding strength of the first portion of the molded body. Further, the copolymer containing 30 mass % or less of a constituent unit derived from the monomer having the polar site inhibits an extreme increase in tackiness of the thermoplastic resin. As a result, the molded body is not likely to have difficulty in a forming process.

When the polyolefin resin as the first thermoplastic resin (A1) has an acid-modified structure, the rate of acid modification is preferably 0.01 mass % or more, more preferably 0.1 mass % or more, and still more preferably 0.2 mass % or more.

When the polyolefin resin as the first thermoplastic resin (A1) has an acid-modified structure, the rate of acid modification is preferably 30 mass % or less, more preferably 20 mass % or less, and still more preferably 10 mass % or less.

When the first thermoplastic resin (A1) has an acid-modified structure, a rate of acid modification of 0.01 mass % or more improves the bonding strength of the first portion of the molded body. Further, a rate of acid modification of 30 mass % or less inhibits an extreme increase in tackiness of the first thermoplastic resin (A1). As a result, the molded body is not likely to have difficulty in a forming process.

Herein, the rate of modification refers to a percentage of a mass of a site derived from the acid relative to a total mass of the acid-modified polyolefin.

Polyolefin Having Maleic Anhydride Structure

The polyolefin resin as the first thermoplastic resin (A1) more preferably has an acid anhydride structure as a polar site. The polar site is more preferably a maleic anhydride structure. The maleic anhydride structure may be a group introduced by graft-modification of a thermoplastic resin or a maleic anhydride copolymer obtained by copolymerization of a monomer having a maleic anhydride structure.

When the maleic anhydride structure is a group introduced by graft-modification of a thermoplastic resin, the rate of maleic anhydride modification of the polyolefin having the maleic anhydride structure is preferably in a range similar to that of the rate of modification for the case where the polyolefin resin as the first thermoplastic resin (A1) has an acid-modified structure. The effect obtained by making the rate of modification fall within the range is also similar to that achievable in the case where the polyolefin resin as the first thermoplastic resin (A1) has an acid-modified structure.

When the polyolefin having the maleic anhydride structure is a copolymer of an olefin monomer and a monomer having a maleic anhydride structure, the ratio of a constituent unit derived from the monomer having the maleic anhydride structure in the copolymer is preferably in a range similar to that of the ratio of a constituent unit derived from a monomer having a polar site in a copolymer of an olefin monomer and the monomer having the polar site. The effect achievable by virtue of the ratio being in the range is also similar to that achievable in the case where the polyolefin resin as the first thermoplastic resin (A1) is a copolymer of an olefin monomer and a monomer having a polar site.

Preferably, a constituent unit derived from olefin in the polyolefin having the maleic anhydride structure is a constituent unit derived from ethylene or propylene. That is, the polyolefin having the maleic anhydride structure is preferably a polyethylene resin having a maleic anhydride structure or a polypropylene resin having a maleic anhydride structure.

Dielectric Filler (B)

The dielectric filler (B) generates heat upon application of a high-frequency electric field.

Preferably, the dielectric filler (B) is a filler that generates heat upon application of a high-frequency electric field having a frequency range of 3 MHz to 300 MHz. Preferably, the dielectric filler (B) is a filler that generates heat upon application of a high-frequency electric field having, within the frequency range of 3 MHz to 300 MHz, for instance, a frequency of 13.56 MHz, 27.12 MHz, or 40.68 MHz.

Type of Dielectric Filler (B)

The dielectric filler (B) is preferably a single one or a combination of two or more of zinc oxide, silicon carbide (SiC), anatase-type titanium oxide, barium titanate, barium titanate zirconate, lead titanate, potassium niobate, rutile-type titanium oxide, hydrated aluminum silicate, inorganic substances having crystallization water such as hydrated aluminosilicate salt of alkali metal, and inorganic substances having crystallization water such as hydrated aluminosilicate salt of alkaline earth metal.

Preferably, the dielectric filler (B) contains at least one selected from the group consisting of zinc oxide, silicon carbide, barium titanate, and titanium oxide.

The dielectric filler (B) is further preferably zinc oxide from among the dielectric fillers exemplified above, because zinc oxide has a lot of types, and various shapes and sizes thereof are selectable, which allows for improving the adhesive characteristics and mechanical characteristics of the molded body in accordance with the purpose of use. Using zinc oxide as the dielectric filler (B) results in a molded body having a colorless first portion. Zinc oxide is small in density among dielectric fillers. Thus, when an adherend and a molded body having the first portion that contains zinc oxide as the dielectric filler (B) are bonded together, the total weight of the joined body is less likely to increase than a case where a molded body containing another dielectric filler is used. Zinc oxide, which is not extremely high in hardness among ceramics, is not likely to damage a device for producing a molded body. Zinc oxide, which is an inactive oxide, is blendable with a thermoplastic resin with a small damage thereto.

Further, titanium oxide as the dielectric filler (B) is preferably at least one of anatase-type titanium oxide or rutile-type titanium oxide, more preferably anatase-type titanium oxide in terms of an excellent dielectric property.

Volume Content Ratio

The volume content ratio of the dielectric filler (B) in the first portion is preferably 5 vol % or more, more preferably 8 vol % or more, and still more preferably 10 vol % or more.

The volume content ratio of the dielectric filler (B) in the first portion is preferably 50 vol % or less, more preferably 40 vol % or less, still more preferably 35 vol % or less, and still further more preferably 25 vol % or less.

At a volume content ratio of the dielectric filler (B) in the first portion of 5 vol % or more, heat generation performance of the first portion is improved, and the molded body and the adherend are likely to be firmly bonded.

At a volume content ratio of the dielectric filler (B) in the first portion of 50 vol % or less, fluidity of the first material during molding and moldability of the molded body are unlikely to decrease.

Since the thermoplastic resin (A1) and the dielectric filler (B) are contained in the first portion of the molded body according to the exemplary embodiment, the volume content ratio of the dielectric filler (B) is preferably 5 vol % or more, more preferably 8 vol % or more, and still more preferably 10 vol % or more with respect to a total volume of the thermoplastic resin (A1) and the dielectric filler (B).

Further, the volume content ratio of the dielectric filler (B) is preferably 50 vol % or less, more preferably 40 vol % or less, still more preferably 35 vol % or less, and still further more preferably 25 vol % or less with respect to a total volume of the thermoplastic resin (A1) and the dielectric filler (B).

Average Particle Diameter

The volume average particle diameter of the dielectric filler (B) is preferably 1 μm or more, more preferably 2 μm or more, and still more preferably 3 μm or more.

The volume average particle diameter of the dielectric filler (B) is preferably 30 μm or less, more preferably 25 μm or less, and still more preferably 20 μm or less.

At a volume average particle diameter of the dielectric filler (B) of 1 μm or more, the first portion of the molded body exhibits high heat generation performance upon application of a high-frequency electric field, and the first portion of the molded body and an adherend can be firmly bonded in a short time.

At a volume average particle diameter of the dielectric filler (B) of 30 μm or less, the first portion of the molded body exhibits high heat generation performance upon application of a high-frequency electric field, and the first portion of the molded body and an adherend can be firmly bonded in a short time. Further, a decrease in strength of the first portion of the molded body is preventable at a volume average particle diameter of the dielectric filler (B) of 30 μm or less.

The volume average particle diameter of the dielectric filler (B) is measured by a method as described below. A particle size distribution of the dielectric filler (B) is measured by a laser diffraction/scattering method and the volume average particle diameter is calculated from a result of the particle size distribution measurement in accordance with JIS Z 8819-2: 2001.

Additives

The first portion of the molded body according to the exemplary embodiment may or may not contain an additive. When the first portion contains an additive, examples of the additive include a tackifier, a plasticizer, a wax, a colorant, an antioxidant, an ultraviolet absorber, an antimicrobial agent, a coupling agent, a viscosity modifier, an organic filler, and an inorganic filler. The organic filler and the inorganic filler as the additive are different from the dielectric filler.

The tackifier and plasticizer allow for improving the melting characteristics and adhesive characteristics of the first portion of the molded body according to the exemplary embodiment.

Examples of the tackifier include a rosin derivative, a polyterpene resin, an aromatic modified terpene resin, a hydride of an aromatic modified terpene resin, a terpene phenol resin, a coumarone-indene resin, an aliphatic petroleum resin, an aromatic petroleum resin, and a hydride of an aromatic petroleum resin.

Examples of the plasticizer include a petroleum process oil, a natural oil, diacid dialkyl, and a low-molecular-weight liquid polymer. Examples of the petroleum process oil include a paraffin process oil, a naphthene process oil, and an aromatic process oil. Examples of the natural oil include a castor oil and a tall oil. Examples of diacid dialkyl include dibutyl phthalate, dioctyl phthalate, and dibutyl adipate. Examples of the low-molecular-weight liquid polymer include liquid polybutene and liquid polyisoprene.

When the first portion of the molded body according to the exemplary embodiment contains an additive, the content ratio of the additive in the first portion is, normally, based on a total mass of the first portion, preferably 0.01 mass % or more, more preferably 0.05 mass % or more, and still more preferably 0.1 mass % or more. Further, the content ratio of the additive in the first portion is preferably 20 mass % or less, more preferably 15 mass % or less, and still more preferably 10 mass % or less.

The first portion of the molded body according to the exemplary embodiment preferably contains no solvent. The molded body including the first portion that contains no solvent is not likely to have a problem of volatile organic compounds (VOC) that may otherwise be caused by an adhesive agent used for bonding with an adherend.

Preferably, the first portion of the molded body according to the exemplary embodiment contains no conductive substance such as a metal, carbon, or a carbon compound containing carbon as a main component (e.g., carbon black).

Preferably, the first portion of the molded body according to the exemplary embodiment does not contain, for instance, carbon steel, a iron, y iron, 5 iron, copper, brass, aluminum, iron-nickel alloy, iron-nickel-chromium alloy, carbon fiber, and carbon black.

When the first portion of the molded body according to the exemplary embodiment contains conductive substances, the content ratios of the conductive substances in the first portion are, based on a total mass of the first portion of the molded body according to the exemplary embodiment, preferably 20 mass % or less, more preferably 10 mass % or less, still more preferably 5 mass % or less, still further more preferably 1 mass % or less, and yet still further more preferably 0.1 mass % or less.

Particularly preferably, the first portion of the molded body according to the exemplary embodiment contains 0 mass % of the conductive substances.

When the first portion of the molded body according to the exemplary embodiment contains 20 mass % or less of conductive substances, a problem of carbonization of a bonding portion and an adherend caused by electrical breakdown in a dielectric heating treatment is easily preventable.

The total of the content ratios of the thermoplastic resin (A) and the dielectric filler (B) in the first portion of the molded body according to the exemplary embodiment is preferably 80 mass % or more, more preferably 90 mass % or more, and still more preferably 99 mass % or more.

Second Portion

In the molded body according to the exemplary embodiment, the second portion includes the second material.

The second material is not particularly limited. Preferably, examples of the second material include at least one selected from the group consisting of an organic material, an inorganic material, and a natural material. Examples of the organic material include a thermoplastic resin and a thermosetting resin. Examples of the inorganic material include ceramic, glass, and metal. Examples of the natural material include wood, paper, leather, and stone.

In the molded body according to the exemplary embodiment, the first material is different from the second material. The wording of "the first material is different from the second material" means that the first material and the second material are not perfectly matched in their compositions. For instance, when the first material contains polypropylene and zinc oxide, the second material may only contain polypropylene. In this case, the second material does not contain zinc oxide, and the first material and the second material are not perfectly matched in their compositions. That is, the first material is different from the second material.

The second material of the second portion may be a fiber-reinforced resin (Fiber Reinforced Plastics, FRP) that is a composite material of a fiber and a plastic material. The plastic material in the fiber-reinforced resin is, for instance, at least one selected from the group consisting of a polypropylene resin, a polyethylene resin, a polyurethane resin, an acrylonitrile-butadiene-styrene copolymer resin (ABS resin), a polycarbonate resin (PC resin), a polyamide resin (e.g., nylon 6 and nylon 66), an epoxy resin, a melamine resin, a phenolic resin, an acrylic resin, a polyester resin (e.g., polyethylene terephthalate (PET resin) and polybutylene terephthalate resin (PBT resin)), a polyacetal resin (POM resin), a polymethyl methacrylate resin, and a polystyrene resin. The fiber in the fiber-reinforced resin is, for instance, at least one selected from the group consisting of a glass fiber, a Kevlar fiber, and a carbon fiber.

Further, the second material of the second portion may be a filler-containing resin that is a composite material of an organic filler or an inorganic filler and a plastic material.

Further, the second material of the second portion may be a resin containing no organic filler or inorganic filler.

Second Thermoplastic Resin (A2)

The second material of the second portion preferably contains a second thermoplastic resin (A2).

The type of the second thermoplastic resin (A2), which is not particularly limited, is preferably, for instance, a thermoplastic resin selected from the thermoplastic resins given in the explanation for the first thermoplastic resin (A1).

When the second material of the second portion contains the second thermoplastic resin (A2), a main composition of the first thermoplastic resin (A1) of the first portion is preferably the same as a main composition of the second thermoplastic resin (A2).

The wording "a main composition of the thermoplastic resin" refers to, for instance, in a case where the thermoplastic resin is a polymer, the most contained repeating unit in the polymer among repeating units contained in the polymer. In a case where the thermoplastic resin is a polymer derived from a single monomer, "a main composition of the thermoplastic resin" refers to the monomer unit (repeating unit). In a case where the thermoplastic resin is a copolymer, "a main composition of the thermoplastic resin" refers to the most contained repeating unit in the polymer. In a case where the thermoplastic resin is a copolymer, "a main composition of the thermoplastic resin" in the copolymer refers to a repeating unit (monomer unit) contained at a content of 30 mass % or more, a repeating unit contained at a content of more than 30 mass % in an example, a repeating unit contained at a content of 40 mass % or more in another example, or a repeating unit contained at a content of 50 mass % or more in still another example. Further, in a case where the thermoplastic resin is a copolymer, two or more repeating units may be the most contained repeating units.

Preferably, the second material of the second portion contains no dielectric filler that generates heat upon application of a high-frequency electric field.

Form and Properties of Molded Body

A form of the molded body according to the exemplary embodiment is not particularly limited.

Figure 1B:
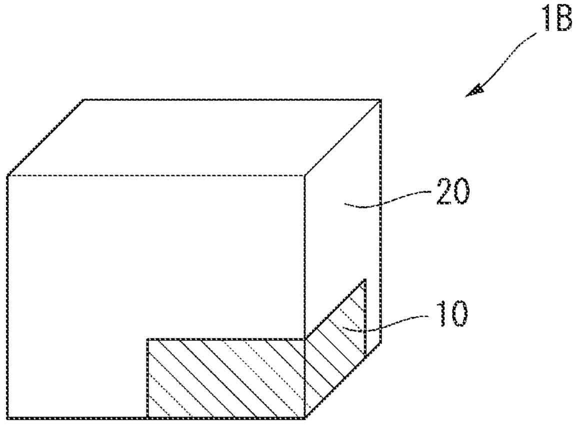
FIG. 1B is a schematic perspective view of an exemplary form of the molded body according to the exemplary embodiment.
Figure 1C:
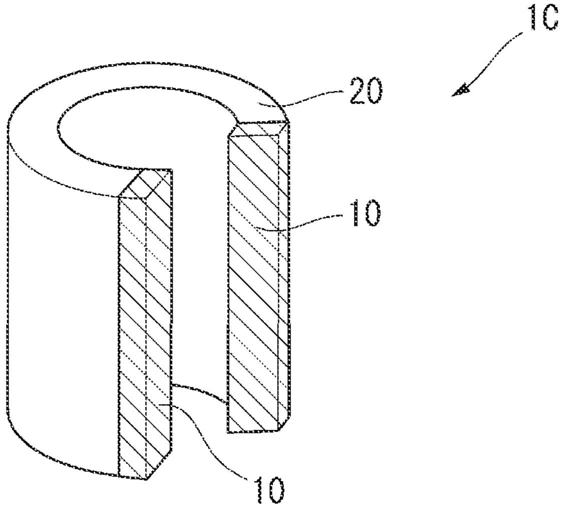
FIG. 1C is a schematic perspective view of an exemplary form of the molded body according to the exemplary embodiment.

FIG. 1A, FIG. 1B, and FIG. 1C are schematic perspective views of exemplary forms of the molded body according to the exemplary embodiment.

A molded body 1A shown in FIG. 1A has a cubic shape. The molded body 1A has a first portion 10 and a second portion 20 that is larger in volume than the first portion 10.

A molded body 1B shown in FIG. 1B also has a cubic shape. The molded body 1B is different from the molded body 1A in the position of the first portion 10 in the cube and the ratio of the first portion 10 to the cube. In the molded body 1A, the first portion 10 is in contact with an entire bottom surface of the second portion 20. In the molded body 1B, the first portion 10, which is positioned at a corner of the cube, is in contact with the second portion 20.

The molded body according to the exemplary embodiment may include a plurality of first portions 10.

For instance, a molded body 1C shown in FIG. 1C includes: a hollow second portion 20 having a substantially cylindrical shape, part of which is cut along an axial direction; and two first portions 10 that are in contact with two end surfaces of the cut cylindrical second portion 20. The number of the first portions in the molded body is not limited to two, and may be three or more.

The form of the molded body according to the invention is not limited to the exemplary forms of the molded bodies 1A, 1B, and 1C. In the exemplary forms of the molded bodies 1A, 1B, and 1C, the first portion 10 is in direct contact with the second portion 20. The invention is not limited to the form in which the first portion is in direct contact with the second portion. The first portion may be in contact with the second portion via another portion (e.g., a third portion).

Herein, the molded body is different from the sheet. The sheet generally refers to a sheet-shaped object having a uniform thickness of 1 mm or less, 2 mm or less, or 5 mm or less.

The flow start temperature of the first portion is preferably 80 degrees C. or more, more preferably 100 degrees C. or more, still more preferably 120 degrees C. or more, and still further more preferably 140 degrees C. or more.

The flow start temperature of the first portion is preferably 300 degrees C. or less, more preferably 250 degrees C. or less, and still more preferably 200 degrees C. or less.

A flow start temperature of the first portion of 80 degrees C. or more allows the joined body obtained by bonding the molded body and the adherend together to easily obtain heat resistance for ordinary life. For instance, when boiling water comes into contact with the first portion, the first portion is not likely to be deformed, and thus the molded body and the adherend are not easily separated from each other.

At a flow start temperature of the first portion of 300 degrees C. or less, the time required for melting the first thermoplastic resin (A1) in the first portion in bonding the molded body and the adherend together is not likely to be long, and the bonding strength between the molded body and the adherend is easily obtainable.

Preferably, the flow start temperature of the second portion is 100 degrees C. or more or the second portion has no flow start temperature.

When the second portion has a flow start temperature, the flow start temperature of the second portion is more preferably 120 degrees C. or more, still more preferably 140 degrees C. or more, still further more preferably 150 degrees C. or more, and yet still further more preferably 160 degrees C. or more.

When the second portion is formed from ceramics, a curable resin, or the like, the flow start temperature of the second portion has no upper limit.

When the flow start temperature of the second portion is 100 degrees C. or more or the second portion has no flow start temperature, the molded body and the adherend are likely to be bonded without impairing the shape of the molded body.

Preferably, a flow start temperature T1 of the first portion and a flow start temperature T2 of the second portion satisfy a relationship of a numerical formula (Numerical Formula 2) below.

$$T1<T2 \qquad \text{(Numerical Formula 2)}$$

Satisfying the relationship of the numerical formula (Numerical Formula 2) allows the molded body and the adherend to be easily bonded without impairing the shape of the molded body.

Preferably, a dielectric property DP1 of the first portion and a dielectric property DP2 of the second portion satisfy a relationship of a numerical formula (Numerical Formula 1).

The dielectric property DP1 refers to a dielectric property value (tan δ/ε'r) of the first portion, and the dielectric property DP2 is a dielectric property value (tan δ/ε'r) of the second portion.

$$DP1>DP2 \qquad \text{(Numerical Formula 1)}$$

where tan δ denotes a dielectric dissipation factor at 23 degrees C. and a frequency of 40.68 MHz and ε'r denotes a relative permittivity at 23 degrees C. and a frequency of 40.68 MHz.

Satisfying the relationship of the numerical formula (Numerical Formula 1) allows the molded body and the adherend to be easily bonded without impairing the shape of the molded body.

The dielectric property (tan δ/ε'r) is a value determined by dividing a dielectric dissipation factor (tan δ) measured using an impedance material device or the like by a relative permittivity (ε'r) measured using the impedance material device or the like.

The dielectric properties (dielectric dissipation factor (tan δ) and relative permittivity (ε'r)) of the first portion and the second portion can be measured simply and accurately using an impedance material analyzer.

Details of a method of measuring the dielectric property of the molded body are as follows. A sheet of the first portion or the second portion is obtained by machining or cutting of the molded body. The thus-obtained sheet is subjected to measurement for the relative permittivity (ε'r) and the dielectric dissipation factor (tan δ) using an RF impedance material analyzer E4991A (produced by Agilent Technologies, Inc.) at a frequency of 40.68 MHz and a temperature of 23 degrees C., and the dielectric property value (tan δ/ε'r) is calculated.

The dielectric property (tan δ/ε'r) of the first portion is preferably 0.005 or more, more preferably 0.008 or more, and still more preferably 0.01 or more.

Further, the dielectric property (tan δ/ε'r) of the first portion is preferably 0.08 or less, more preferably 0.05 or less.

The dielectric property (tan δ/ε'r) of the second portion is preferably 0.01 or less, more preferably 0.008 or less.

Further, the dielectric property (tan δ/ε'r) of the second portion is normally zero or more.

With the dielectric property of the first portion being 0.005 or more, a problem in which the molded body and the adherend have difficulty in being firmly bonded is preventable, which may otherwise be caused by insufficient heat generation of the first portion during a dielectric heating treatment.

With the dielectric property of the first portion being 0.08 or less, an adherend in contact with the first portion is unlikely to be damaged.

With the dielectric property of the second portion being 0.01 or less, the heat generation of the second portion is reducible, making it possible to easily bond the molded body and the adherend without impairing the shape of the molded body.

Method of Producing Molded Body

A method of producing the molded body according to the exemplary embodiment is not particularly limited.

For instance, it is also preferable that the molded body according to the exemplary embodiment be produced by a multicolor molding method using the first material and the second material.

Further, for instance, it is also preferable that the molded body according to the exemplary embodiment be produced by an insert molding method using a first molded body formed from one of the first material and the second material and using the other of the first material and the second material.

For instance, the second material may be metal or ceramic. In this case, the second portion made of metal or ceramic may be prepared to have a desired shape in advance. Then, insert molding may be performed using the second portion and the first material to produce the molded body according to the exemplary embodiment.

Further, it is also preferable that the molded body according to the exemplary embodiment be produced, for instance, as follows: the first molded body is formed using one of the first material and the second material through injection molding or compression molding, and then insert molding is performed by using the first molded body and the other of the first material and the second material.

For instance, the first molded body is formed using the second material through injection molding or compression molding. The first molded body corresponds to the second portion. Then, the first material and the first molded body may be used in insert molding to produce the molded body. The portion formed of the first material through insert molding corresponds to the first portion.

Usage of Molded Body

The molded body according to the exemplary embodiment is usable for bonding with an adherend. Further, the molded body according to the exemplary embodiment is also usable for bonding a plurality of adherends.

Preferably, the molded body according to the exemplary embodiment be used for bonding an adherend to a surface of the first portion of the molded body.

Preferably, the molded body according to the exemplary embodiment be used in such a manner that an electrode of a dielectric heating device is in contact with a surface of a portion other than the first portion in the molded body. For instance, when the molded body includes the first portion and the second portion, a portion other than the first portion in the molded body is the second portion; when the molded body includes the first portion, the second portion, and the third portion, a portion other than the first portion in the molded body is at least one of the second portion or the third portion; and when the molded body further includes the third to N-th portions (N: an integer equal to or larger than four), a portion other than the first portion in the molded body is at least one of the second to N-th portions. Preferably, only the first portion of the molded body contains a dielectric filler that generates heat upon application of a high-frequency electric field. Further, a portion other than the first portion in the molded body may be an adherend. When a lattice-electrode high-frequency dielectric heating device described later is used, it is also preferable that a lattice electrode be in contact with a surface of an adherend as a surface of a portion other than the first portion.

The material used for the adherend is not particularly limited. The material used for the adherend may be any one of an organic material and an inorganic material (including a metal material and the like), or may be a composite of the organic and inorganic materials.

Examples of the organic material as the material of the adherend include a plastic material and a rubber material. Examples of the plastic material include a polypropylene resin, a polyethylene resin, a polyurethane resin, an acrylonitrile-butadiene-styrene copolymer resin (ABS resin), a polycarbonate resin (PC resin), a polyamide resin (e.g., nylon 6 and nylon 66), a polyester resin (e.g., polyethylene terephthalate (PET resin) and polybutylene terephthalate resin (PBT resin)), a polyacetal resin (POM resin), a polymethyl methacrylate resin, and a polystyrene resin. Examples of the rubber material include styrene-butadiene rubber (SBR), ethylene propylene rubber (EPR), and silicone rubber. The adherend may be a foam of the organic material.

Examples of the inorganic material as the material of the adherend include a glass material, a cement material, a ceramic material, and a metal material. Further, the adherend may be a fiber reinforced resin (fiber reinforced plastics (FRP)) that is a composite material of fibers and the above plastic material. The plastic material in the fiber-reinforced resin is at least one resin selected from the group consisting of a polypropylene resin, a polyethylene resin, a polyurethane resin, an acrylonitrile-butadiene-styrene copolymer resin (ABS resin), a polycarbonate resin (PC resin), a polyamide resin (e.g., nylon 6 and nylon 66), a polyester resin (polyethylene terephthalate (PET resin) and a polybutylene terephthalate resin (PBT resin)), a polyacetal resin (POM resin), a polymethyl methacrylate resin, and a polystyrene resin. Examples of fiber in the fiber-reinforced resin include a glass fiber, a Kevlar fiber, and a carbon fiber.

In a case of bonding a plurality of adherends using the molded body according to the exemplary embodiment, the material of the adherends are the same or different. The shape and size of the adherends may be the same or different. The shape of the adherend, which is not particularly limited, preferably has a surface capable of being in contact with the first portion of the molded body according to the exemplary embodiment. Examples of the shape of the adherend include a cube, a rectangular parallelepiped, a polygonal pyramid, a prism, a column, a cone, a cylinder, a sphere, a hemisphere, a sheet shape, and a plate shape.

Figure 2A:
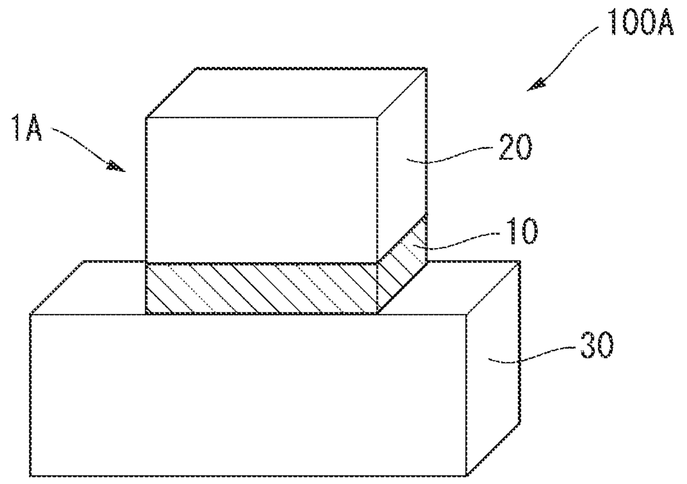
FIG. 2A is a schematic perspective view of an exemplary form of a joined body obtained by bonding the molded body according to the exemplary embodiment and an adherend together.
Figure 2B:
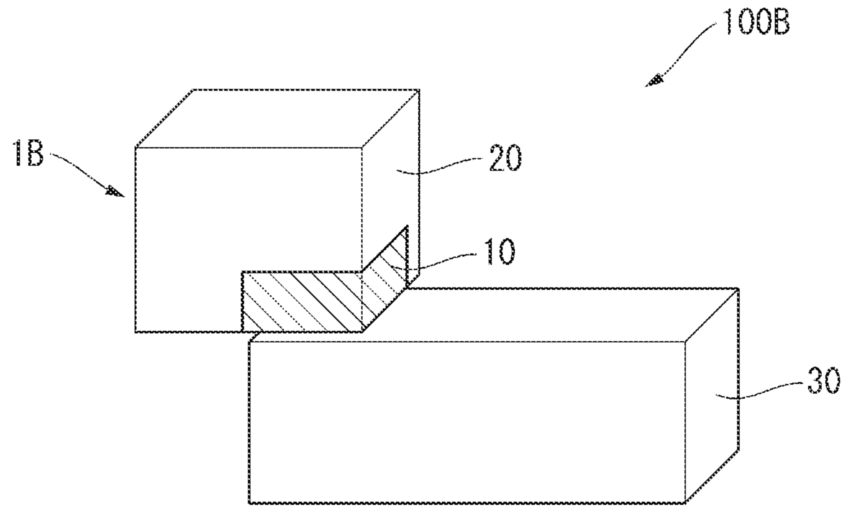
FIG. 2B is a schematic perspective view of an exemplary form of a joined body obtained by bonding the molded body according to the exemplary embodiment and an adherend together.
Figure 2C:
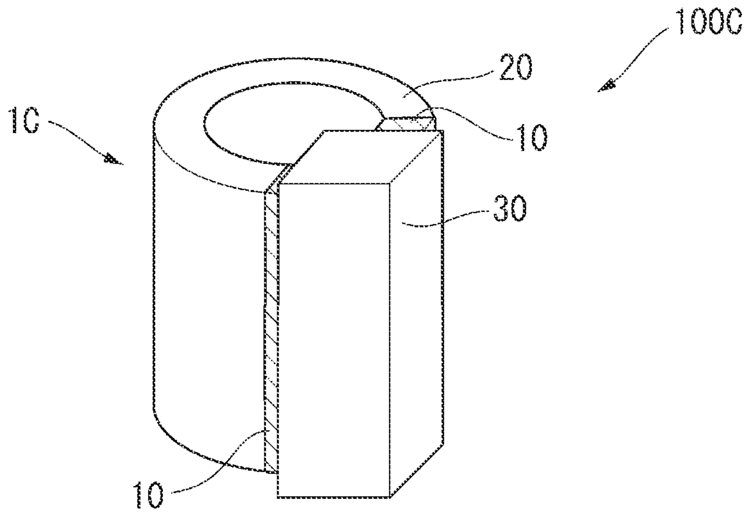
FIG. 2C is a schematic perspective view of an exemplary form of a joined body obtained by bonding the molded body according to the exemplary embodiment and an adherend together.

FIG. 2A, FIG. 2B, and FIG. 2C are schematic perspective views of exemplary forms of a joined body obtained by bonding the molded body according to the exemplary embodiment and an adherend together.

FIG. 2A is a schematic perspective view of a joined body 100A obtained by bonding the molded body 1A and an adherend 30. In the joined body 100A, the adherend 30 is bonded to a surface of the first portion 10 located near a bottom surface of the molded body 1A.

FIG. 2B is a schematic perspective view of a joined body 100B obtained by bonding the molded body 1B and the adherend 30. In the joined body 100B, the adherend 30 is bonded to a surface of the first portion 10 located at a corner near a bottom surface of the molded body 1B.

FIG. 2C is a schematic perspective view of a joined body 100C obtained by bonding the molded body 1C and the adherend 30. In the joined body 100C, the adherend 30 is bonded to two surfaces of the first portion 10 of the cut cylindrical molded body 1C.

Bonding Method

A bonding method according to the exemplary embodiment is a bonding method using the molded body according to the exemplary embodiment.

The bonding method according to the exemplary embodiment is a bonding method for bonding the molded body according to the exemplary embodiment and an adherend different from the molded body. Preferably, the bonding method includes: bringing the adherend into contact with a surface of the first portion; bringing an electrode of a dielectric heating device into contact with a surface of a portion other than the first portion; and applying a high-frequency electric field to the molded body using the dielectric heating device to bond the molded body and the adherend.

An exemplary bonding method according to the exemplary embodiment is explained below, using an example where a molded body including a first portion and a second portion is bonded with an adherend. The invention, however, is not limited to this example.

An exemplary bonding method according to the exemplary embodiment includes steps P1, P2, and P3 as below.

Step P1

The step P1 is a step of bringing an adherend into contact with a surface of the first portion. The adherend may be brought into contact with a part of the surface of the first portion of the molded body according to the exemplary embodiment, a plurality of spots in the surface of the first portion, or the entire surface of the first portion.

Step P2

The step P2 is a step of bringing an electrode of a dielectric heating device into contact with a surface of a portion (the second portion) other than the first portion, which is brought into contact the adherend in the step P1, in the molded body.

Step P3

The step P3 is a step of applying a high-frequency electric field to the molded body using the dielectric heating device to bond the molded body and the adherend. In the step P3, for instance, a high-frequency electric field in a range from 3 MHz to 300 MHz is applied to bond the molded body and the adherend. Further, for instance, a high-frequency electric field can be applied to the molded body using a dielectric heating adhesion device. Herein, the "dielectric heating device" is occasionally referred to as the "dielectric heating adhesion device" or "high-frequency dielectric heating device".

Figure 3:
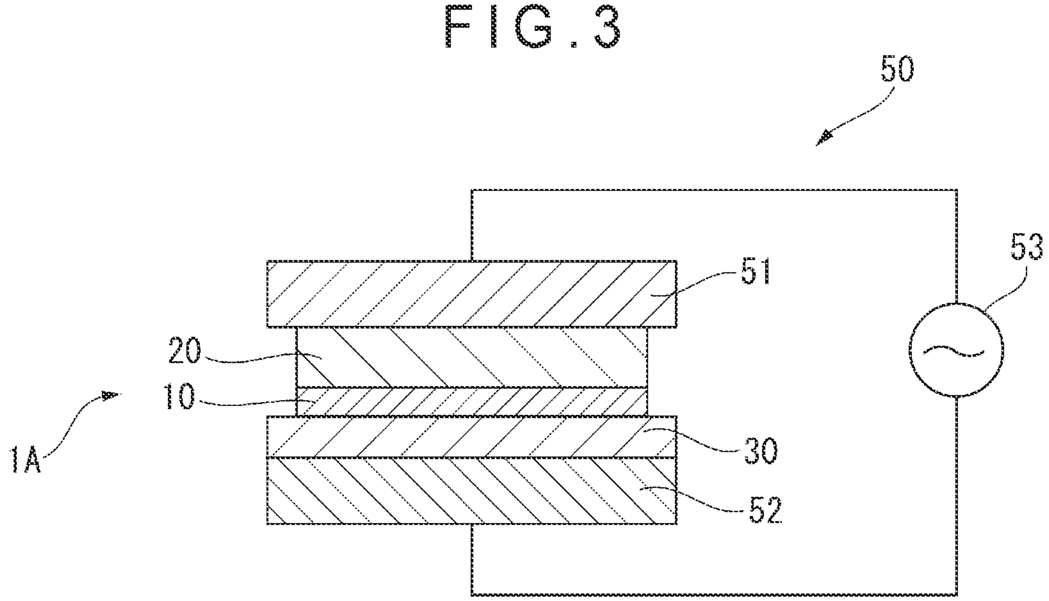
FIG. 3 is a schematic diagram for illustrating a high-frequency dielectric heating process using the molded body according to the exemplary embodiment and a dielectric heating device.

FIG. 3 is a schematic diagram for illustrating a high-frequency dielectric heating process using the molded body 1A that is an exemplary molded body of the exemplary embodiment and a dielectric heating adhesion device 50 as the dielectric heating device.

Dielectric Heating Adhesion Device

FIG. 3 schematically shows the dielectric heating adhesion device 50.

The dielectric heating adhesion device 50 includes a first high-frequency electric field application electrode 51, a second high-frequency electric field application electrode 52, and a high-frequency power source 53.

The first high-frequency electric field application electrode 51 and the second high-frequency electric field application electrode 52 are arranged opposite to each other. The first high-frequency electric field application electrode 51 and the second high-frequency electric field application electrode 52 include a press mechanism. The press mechanism enables the molded body 1A and the adherend 30 to be subjected to a pressure treatment between the first high-frequency electric field application electrode 51 and the second high-frequency electric field application electrode 52. As shown in FIG. 3, the first portion 10 of the molded body 1A is in contact with the adherend 30, and is not contact with the first high-frequency electric field application electrode 51 and the second high-frequency electric field application electrode 52 of the dielectric heating adhesion device 50. Further, the second portion 20 of the molded body 1A that is a portion other than the first portion 10 is in contact with the first high-frequency electric field application electrode 51, as shown in FIG. 3.

When the first high-frequency electric field application electrode 51 and the second high-frequency electric field application electrode 52 are in the form of a pair of plate electrodes parallel with each other, such an electrode arrangement is occasionally referred to as a parallel-plate type.

A high-frequency dielectric heating device in a parallel-plate type is also preferably used to apply a high-frequency electric field. The parallel-plate high-frequency dielectric heating device causes a high-frequency electric field to penetrate through the first portion located between the electrodes, making it possible to heat the whole of the first portion and to bond the adherend with the molded boy in a short time.

The first high-frequency electric field application electrode 51 and the second high-frequency electric field application electrode 52 are each connected to the high-frequency power source 53 for applying a high-frequency electric field having, for instance, a frequency of approximately 13.56 MHz, approximately 27.12 MHz, or approximately 40.68 MHz.

As shown in FIG. 3, the dielectric heating adhesion device 50 performs a dielectric heating treatment through the molded body 1A in contact with the adherend 30. Further, the dielectric heating adhesion device 50 performs, in addition to the dielectric heating treatment, a pressure treatment using the first high-frequency electric field application electrode 51 and the second high-frequency electric field application electrode 52 to bond the molded body 1A and the adherend 30. Note that the molded body 1A and the adherend 30 may be bonded to each other without performing the pressure treatment.

When a high-frequency electric field is applied to between the first high-frequency electric field application electrode 51 and the second high-frequency electric field application electrode 52, the dielectric filler (not shown in the drawings), which is dispersed in the first portion 10 of the molded body 1A, absorbs high-frequency energy.

The dielectric filler functions as a heat generation source. The heat generation of the dielectric filler melts thermoplastic resin components, eventually making it possible to firmly bond the molded body 1A and the adherend 30 in a short time.

The first high-frequency electric field application electrode 51 and the second high-frequency electric field application electrode 52, which include the press mechanism, also function as a press device. In this arrangement, pressure is applied in compression directions by the first high-frequency electric field application electrode 51 and the second high-frequency electric field application electrode 52, and the first portion 10 of the molded body 1A is melt by heating. The molded body 1A and the adherend 30 are thus more firmly bonded. Note that the molded body 1A and the adherend 30 can be bonded together without application of pressure.

High-Frequency Dielectric Heating Adhesive Conditions

High-frequency dielectric heating adhesive conditions can be modified as appropriate but the following conditions are preferable.

The output of the high-frequency electric field is preferably 10 W or more, more preferably 30 W or more, still more preferably 50 W or more, and still further more preferably 80 W or more.

The output of the high-frequency electric field is preferably 50,000 W or less, more preferably 20,000 W or less, still more preferably 15,000 W or less, still further more preferably 10,000 W or less, and yet still further more preferably 1,000 W or less.

An output of the high-frequency electric field of 10 W or more is not likely to cause a problem in which the temperature has difficulty in increasing in the dielectric heating treatment. Thus, a sufficient adhesion force is easily obtained.

An output of the high-frequency electric field of 50,000 W or less is not likely to cause a problem in which temperature control by the dielectric heating treatment is difficult.

The application time of the high-frequency electric field is preferably one second or more.

The application time of the high-frequency electric field is preferably 180 seconds or less, more preferably 120 seconds or less, still more preferably 100 seconds or less, still further more preferably 80 seconds or less, and yet still further more preferably as short as 60 seconds or less, 45 seconds or less, 35 seconds or less, 25 seconds or less, or 10 seconds or less.

An application time of the high-frequency electric field of one second or more is not likely to cause a problem in which the temperature has difficulty in increasing in the dielectric heating treatment. Thus, a sufficient bonding force is easily obtained.

An application time of the high-frequency electric field of 180 seconds or less is not likely to cause problems of a decrease in production efficiency of the joined body obtained by bonding the molded body according to the exemplary embodiment and the adherend, an increase in production costs, and heat deterioration of the adherend.

The frequency of the high-frequency electric field to be applied is preferably 1 kHz or more, more preferably 1 MHz or more, still more preferably 5 MHz or more, and still further more preferably 10 MHz or more.

The frequency of the high-frequency electric field to be applied is preferably 300 MHz or less, more preferably 100 MHz or less, still more preferably 80 MHz or less, and still further more preferably 50 MHz or less. Specifically, an industrial frequency band of 13.56 MHz, 27.12 MHz, or 40.68 MHz, which is designated by the International Telecommunication Union, is also usable for the bonding method of the exemplary embodiment.

Effects of Exemplary Embodiment

According to the exemplary embodiment, it is possible to provide a molded body that is capable of being bonded to an adherend (another molded article) by high-frequency dielectric heating without using an adhesive agent and that is unlikely to be deformed during bonding. Further, according to the exemplary embodiment, it is possible to provide a bonding method using the molded body. According to the exemplary embodiment, it is possible to provide a method of producing the molded body.

The molded body according to the exemplary embodiment is not only easy to handle but also improved in workability in bonding with the adherend as compared with a case where an adhesive agent required to be applied is used.

The first portion of the molded body according to the exemplary embodiment is excellent in water resistance and moisture resistance as compared with a typical sticky agent.

The first portion of the molded body according to the exemplary embodiment is heated through application of a high-frequency electric field, which allows the first portion to be locally heated, instead of the whole of the molded body, during the application of the high-frequency electric field. Thus, the molded body according to the exemplary embodiment is not likely to have a problem in which the whole of the molded body and the adherend melts at the time of bonding.

In the bonding method using the molded body according to the exemplary embodiment, only a predetermined portion (first portion) can be locally heated by a dielectric heating adhesion device from the outside. Thus, even when the adherend is in the form of a large-sized and complicated three-dimensional structure, a thick and complicated three-dimensional structure, or the like, and in addition, high dimensional accuracy is required, the bonding method using the molded body according to the exemplary embodiment is beneficial.

Modifications of Exemplary Embodiment

The invention is not limited to the above exemplary embodiment. The invention can include modifications, improvements, and the like as long as they are compatible with the object of the invention.

In the exemplary embodiment, an example in which, when the second material of the second portion contains the second thermoplastic resin (A2), the main composition of the first thermoplastic resin (A1) of the first portion is the same as the main composition of the second thermoplastic resin (A2) is taken as a preferred example. However, for instance, the main composition of the first thermoplastic resin (A1) is different from the main composition of the second thermoplastic resin (A2) in another example of the invention.

The molded body may have a sticky portion. The sticky portion inhibits an offset in position when the molded body is in contact with an adherend and a high-frequency electric field is applied thereto, allowing the molded body to be placed at an accurate position. The sticky portion may be provided on a surface of the molded body. Further, the sticky portion may be partially provided with respect to the surface of the molded body. Even without the sticky portion, the molded body can be bonded to an adherend by virtue of the first portion.

The high-frequency dielectric heating treatment may be performed by a lattice-electrode high-frequency dielectric heating device without being limited to the dielectric heating adhesion device including the electrodes arranged opposite to each other described in the above exemplary embodiment. The lattice-electrode high-frequency dielectric heating device includes a lattice electrode in which electrodes having a first polarity and electrodes having a second polarity are alternatively arranged at regular intervals in the same surface, the first polarity being opposite to the second polarity.

Also preferably, the lattice-electrode high-frequency dielectric heating device is used to apply a high-frequency electric field. The use of the lattice-electrode high-frequency dielectric heating device allows the molded body and an adherend to bond to each other without being affected by the thickness of the adherend through application of a high-frequency electric field from a position less distant to the first portion on a front-layer side of the adherend or a front-layer side of the second portion. Further, the use of the lattice-electrode high-frequency dielectric heating device reduces energy required for producing the joined body.

It should be noted that an example using the dielectric heating adhesion device provided with electrodes arranged opposite to each other is exemplary shown in the diagram for the purpose of simplification.

EXAMPLES

The invention will be described below in further detail with reference to Examples. The invention is by no means limited to these Examples.

Production of Molded Body

Example 1

A molded body according to Example 1 was produced following a procedure below.

First, the first material for forming the first portion and the second material for forming the second portion were premixed in separate containers at compositions (vol %) shown in Table 1. The premixed material was supplied into a hopper of a 30-mm-diameter twin-screw extruder. Then, the premixed material was melted and kneaded at a cylinder setting temperature in a range from 200 degrees C. to 230 degrees C. and a die temperature of 230 degrees C. The material subjected to the melt kneading was cooled, followed by cut into granular pellets of the first material and the second material.

Figure 4A:
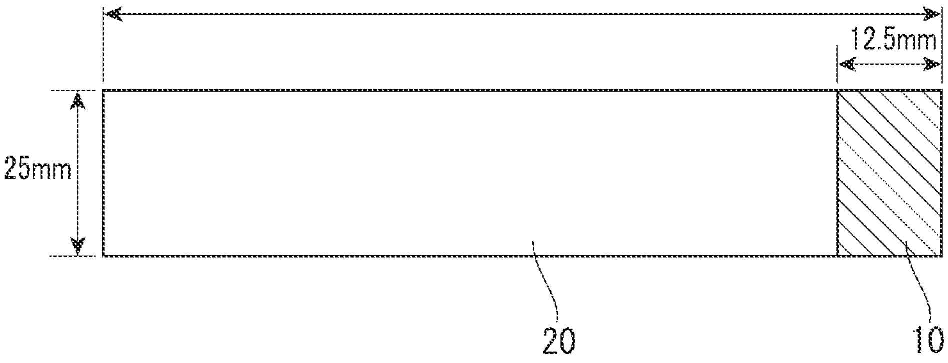
FIG. 4A is a plan view of a molded body produced in Example.
Figure 4B:
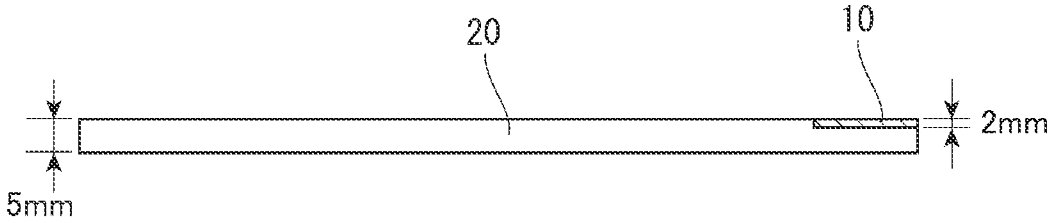
FIG. 4B is a side view of the molded body of FIG. 4A.

Using the granular pellets of the first material and the second material, the molded body according to Example 1 in a shape as shown in FIGS. 4A and 4B was produced with a two-color injection molding machine. FIGS. 4A and 4B show shapes of the first portion 10 and the second portion 20 of the molded body produced in Example, and the like.

Example 2

A molded body according to Example 2 was produced as in the molded body according to Example 1 except that the composition of the first material in Example 1 was changed to a composition (vol %) shown in Table 1 and a material having a composition shown in Table 1 was prepared and used as the second material.

Example 3

A molded body according to Example 3 is different in molding method from Example 1.

First, using the same second material as Example 1, the first molded body according to Example 3 including the second portion 20 in the shape as shown in FIGS. 4A and 4B was produced with an injection molding machine. Subsequently, using the first molded body and the same first material as Example 1, the molded body according to Example 3 in the shape as shown in FIGS. 4A and 4B was produced with an insert molding machine.

Example 4

A molded body according to Example 4 is different in molding method and composition of the second material from Example 2.

First, the second material having a composition shown in Table 1 was prepared. Subsequently, using the second material, the first molded body according to Example 4 including the second portion 20 in the shape as shown in FIGS. 4A and 4B was produced by a compaction molding method using a heat compaction molding machine. Then, using the first molded body and the same first material as Example 2, the molded body according to Example 4 in the shape as shown in FIGS. 4A and 4B was produced with an insert molding machine.

Comparative Example 1

A molded body according to Comparative Example 1 was produced as in the molded body according to Example 1 except that the second material having the same composition (vol %) as the first material was used. Specifically, in Comparative Example 1, a molded body including the first portion and the second portion of which material has the same composition was produced.

Materials used as the first material and the second material shown in Table 1 are as follows.

PP: polypropylene (MFR=7.0 g/10 min)

m-PP: maleic anhydride-modified polypropylene (MFR=9.0 g/10 min)

PA6: Nylon 6 zinc oxide (ZnO): zinc oxide with a volume average particle diameter of 11 μm, produced by SAKAI CHEMICAL INDUSTRY CO., LTD., product name "LP-ZINC11"

glass fiber epoxy resin prepreg: an uncured material including a glass fiber impregnated with an epoxy resin (a glass-fiber content ratio: 70 vol %)

Volume Average Particle Diameter of Dielectric Filler

The particle size distribution of the dielectric filler was measured by a laser diffraction/scattering method. The volume average particle diameter was calculated from a result of the measurement of particle size distribution in accordance with JIS Z 8819-2: 2001. The volume average particle diameter of zinc oxide (ZnO) calculated was 11 μm.

Flow Start Temperature

Flow start temperatures of the first and second portions of the molded body were measured by a flow tester (model No. "CFT-100D" produced by Shimadzu Corporation). A load was set to 5.0 kg, and a die of 2.0 mm in hole diameter and 5.0 mm in length and a cylinder of 11.329 mm in inner diameter were used. A measurement sample was produced by cutting each of the first portion and the second portion of the molded body into a size of approximately 2 mm×2 mm×2 mm. A stroke displacement rate (mm/min) that depended on rising temperature was measured at a sample-temperature-increase rate of 10 degrees C./min to obtain a temperature-dependent chart of the stroke displacement rate of the measurement sample. In this chart, a temperature, at which the stroke displacement rate increased again after passing through a peak on a low-temperature side, was determined as the flow start temperature. Table 1 shows the flow start temperatures of the first portion and the second portion.

Dielectric Property

The molded body was machined to obtain a sheet of each of the first portion and the second portion with a size of 10 mm×10 mm×2 mm. A dielectric material test fixture 16453A (produced by Agilent Technologies, Inc.) was attached to an RF impedance material analyzer E4991A (produced by manufactured by Agilent Technologies, Inc.), and the relative permittivity (ε'r) and the dielectric dissipation factor (tan δ) of the obtained sheet were measured by a parallel plate method at a frequency of 40.68 MHz and a temperature of 23 degrees C. A dielectric property value (tan δ/ε'r) was calculated based on the measurement results. Table 1 shows the dielectric properties (tan δ/ε'r) of the first portion and the second portion.

Method of Evaluating Molded Body

The produced molded body was evaluated by methods described below. Table 1 shows evaluation results.

Evaluation of High-Frequency Adhesion Suitability

A test piece was produced by bonding the molded body to an adherend made of glass-fiber reinforced polypropylene, and a high frequency adhesion property was evaluated. The size of the adherend was 25 mm in width, 100 mm in length, and 2 mm in thickness. The first portion of the molded body and the adherend were arranged in a stacked manner between electrodes of the high-frequency dielectric heating device. One of the electrodes of the high-frequency dielectric heating device was brought into contact with the second portion of the molded body, the other electrode was brought into contact with the adherend. No electrode was brought into contact with the first portion. After the electrodes, the molded body, and the adherend were arranged as described above, a high-frequency electric field was applied under high frequency application conditions as below to bond the molded body and the adherend to produce a test piece.

High-Frequency Application Conditions

Frequency: 40.68 MHz

Output: 200 W

Application time: 10 seconds

The high frequency adhesion property of the molded body was evaluated in accordance with the following criteria.

A: The molded body and the adherend were bonded together with no problem.

F: The molded body was greatly deformed or a melt stuck to the electrode.

Evaluation of Adhesion Force (Tensile Shear Strength)

The tensile shear strength of the test piece obtained for "Evaluation of High-Frequency Adhesion Suitability" was measured using a universal tensile tester. The tensile shear strength was measured in accordance with JIS K 6850: 1999. The tensile shear strength was measured at a temperature of 25 degrees C. and a tensile rate of 100 mm/min.

The tensile shear strength measured was evaluated as adhesion force of the molded body. For Comparative Example 1, the shape of the molded body was deformed and thus the measurement of the tensile shear force was not performed.

A: The adhesion force was 0.5 MPa or more

F: The adhesion force was less than 0.5 MPa

TABLE 1

| | Molded Body | | | | | | | | | | |
|---|---|---|---|---|---|---|---|---|---|---|---|
| | First Portion | | | | | Second Portion | | | | | |
| | Composition of First Material (vol %) | | | Flow Start Temperature | Dielectric Property | Composition of Second Material (vol %) | | | | | |
| | PP | m-PP | ZnO | (° C.) | (—) | PP | PAS | glass fiber | epoxy resin prepreg | ZnO |
| Ex. 1 | 80 | — | 20 | 159 | 0.015 | 90 | — | 10 | — | — |
| Ex. 2 | — | 80 | 20 | 162 | 0.014 | — | 100 | — | — | — |
| Ex. 3 | 80 | — | 20 | 159 | 0.015 | 90 | — | 10 | — | — |
| Ex. 4 | — | 80 | 20 | 162 | 0.014 | — | — | — | 100 | — |
| Comp. 1 | 80 | — | 20 | 159 | 0.015 | 80 | — | — | — | 20 |

| | Molded Body | | | Evaluation Result | |
|---|---|---|---|---|---|
| | Second Portion | | | | |
| | Flow Start Temperature (° C.) | Dielectric Property (—) | Molding Method | High-Frequency Adhesion Suitability | Adhesion Force |
| Ex. 1 | 168 | 0.000 | two-color injection molding | A | A |
| Ex. 2 | 202 | 0.006 | two-color injection molding | A | A |
| Ex. 3 | 168 | 0.000 | injection molding →insert molding | A | A |
| Ex. 4 | >300° C. | 0.003 | heat compaction molding → insert molding | A | A |
| Comp. 1 | 159 | 0.015 | two-color injection molding | F | not measureable |

The molded bodies according to Examples 1 to 4 were each bonded to the adherend by high-frequency dielectric heating, and were not deformed in bonding. Further, the results revealed that the molded body according to each of Examples 1 to 4 was capable of being firmly bonded to the adherend without using an adhesive sheet.

The invention claimed is:

1. A molded body, comprising:

a first portion comprising a first material comprising a first thermoplastic resin (A1) and a dielectric filler (B) that generates heat upon application of a high-frequency electric field; and a second portion comprising a second material different from the first material of the first portion, wherein:

the molded body is not a sheet, a dielectric property DP1 of the first portion is 0.005 or more, a dielectric property DP2 of the second portion is 0.01 or less, the dielectric property DP1 and the dielectric property DP2 satisfy a relationship of a numerical formula (Numerical Formula 1) below, and the dielectric property DP1 is a dielectric property value (tan δ/ε'r) of the first portion and the dielectric property DP2 is a dielectric property value (tan δ/ε'r) of the second portion, $$DP1>DP2 \quad \text{(Numerical Formula 1)}$$

where tan δ is a dielectric dissipation factor at 23 degrees C. and a frequency of 40.68 MHz, and ε'r is a relative permittivity at 23 degrees C. and a frequency of 40.68 MHz.

2. The molded body according to claim 1, wherein a volume content ratio of the dielectric filler (B) of the first portion is in a range from 5 vol % to 50 vol %.

3. The molded body according to claim 1, wherein a flow start temperature of the first portion is in a range from 80 degrees C. to 300 degrees C.

4. The molded body according to claim 1, wherein a flow start temperature of the second portion is 100 degrees C. or more or the second portion has no flow start temperature.

5. The molded body according to claim 1, wherein a flow start temperature T1 of the first portion and a flow start temperature T2 of the second portion satisfy a relationship of a numerical formula (Numerical Formula 2) below, $$T1<T2. \quad \text{(Numerical Formula 2)}$$

6. The molded body according to claim 1, wherein the second material of the second portion comprises a second thermoplastic resin (A2).

7. The molded body according to claim 6, wherein a main composition of the first thermoplastic resin (A1) is identical to a main composition of the second thermoplastic resin (A2).

8. The molded body according to claim 1, wherein a surface of the first portion is bonded to an adherend in use.

9. The molded body according to claim 1, wherein a surface of a portion other than the first portion in the molded body is brought into contact with an electrode of a dielectric heating device in use.

10. A bonding method of bonding the molded body according to claim 1 and an adherend different from the molded body, the method comprising:

bringing the adherend into contact with a surface of the first portion;

bringing an electrode of a dielectric heating device into contact with a surface of a portion other than the first portion; and applying a high-frequency electric field to the molded body using the dielectric heating device to bond the molded body and the adherend.

11. A molded body production method of producing the molded body according to claim 1, the method comprising molding the molded body by a multicolor molding method using the first material and the second material.

12. A molded body production method of producing the molded body according to claim 1, the method comprising producing the molded body by an insert molding method using a first molded body formed from one of the first material and the second material and using the other of the first material and the second material.

13. A molded body production method of producing the molded body according to claim 1, the method comprising:

molding a first molded body by an injection molding method or a compaction molding method using one of the first material and the second material; and producing the molded body by an insert molding method using the other of the first material and the second material and the first molded body.

* * * * *